United States Patent [19]

Poirier et al.

[11] Patent Number: 5,255,316
[45] Date of Patent: Oct. 19, 1993

[54] HANDS-FREE TELEPHONE APPARATUS

[75] Inventors: Jean-Pierre Poirier, Saint Denis; Francois Bonneau, Saint Gratien; Denis Dutey, Montbrison, all of France

[73] Assignee: Alcatel N.V., Amsterdam, Netherlands

[21] Appl. No.: 739,598

[22] Filed: Jul. 31, 1991

[30] Foreign Application Priority Data

Aug. 8, 1990 [FR] France .................. 90 10123

[51] Int. Cl.$^5$ .................................. H04M 1/60
[52] U.S. Cl. ........................ 379/389; 379/390
[58] Field of Search .......... 379/387, 388, 389, 390, 379/420

[56] References Cited

U.S. PATENT DOCUMENTS

| | | | |
|---|---|---|---|
| 4,488,007 | 12/1984 | Chataignon et al. ......... 179/81 |
| 4,513,177 | 4/1985 | Nishino et al. ........... 379/389 |
| 4,604,501 | 8/1986 | Richmond et al. ......... 379/389 |
| 4,677,661 | 6/1987 | Van Gilluwe et al. ..... 379/389 X |
| 4,715,062 | 12/1987 | Korsky et al. ........... 379/390 |
| 4,891,837 | 1/1990 | Walker et al. ........... 379/388 X |
| 4,982,427 | 1/1991 | Nicolai .................. 379/406 |
| 5,075,687 | 12/1991 | Chen et al. ............. 379/390 X |

FOREIGN PATENT DOCUMENTS

| | | |
|---|---|---|
| 0364312 | 4/1990 | European Pat. Off. |
| 3137314 | 4/1983 | Fed. Rep. of Germany. |
| 2174578 | 11/1986 | United Kingdom. |

Primary Examiner—James L. Dwyer
Assistant Examiner—M. Shehata
Attorney, Agent, or Firm—Robbins, Berliner & Carson

[57] ABSTRACT

Digital-type hands-free telephone apparatus is provided including a microcontroller, an audio board and a COFIDEC circuit, in which the microcontroller permanently calculates the average values of 16 successive samples on each one of the send and receive channels and deduces therefrom which channel is to be enabled while attenuating the other using tables provided in ROM memory.

4 Claims, 3 Drawing Sheets

5,255,316

HANDS-FREE TELEPHONE APPARATUS

BACKGROUND OF THE INVENTION

The present invention relates to telephone apparatus fitted with an amplifier and commonly referred as hands-free telephone apparatus.

A hands-free telephone set is one in which a sensitive microphone and a loudspeaker both working in association with high-gain amplifiers are incorporated into the housing of the set thus no longer requiring the user to hold a handset close to his mouth and ear.

This ease of use is nevertheless compensated for by one constraint consisting in the necessity of conversing alternatively in order to avoid feedback effect such as the Larsen effect which would otherwise occur as a result of acoustic, mechanical and electrical coupling between the send and receive channels. Such alternating operation is of course automatic and numerous documents, such as French Patent Application 2 518 854 provide a detailed description of it. In this known art, analog devices are employed which permanently test the respective levels of the signal being sent and received in order to decide which channel should be enabled. This channel is then transmitted normally without any attenuation except for its inherent attenuation while the other channel is subject to appreciable attenuation generally of the order of 40 to 50 dB to give some idea of the order of magnitude. Such discrimination enables a decision to be made as to which channel is sending at the start of conversation and then to possibly change the channel when sending comes to an end, even temporarily. During sending, the other channel cannot in principle be enabled even if an attempt is made to activate it in order to break in while the other user is speaking because it is in any case strongly attenuated.

The analog processing employed in the known devices suffers from the disadvantage that it does not allow fairly rapid detection and comparison of the signals that are present on the send and receive channels. Decision taking which requires a good twenty milliseconds in this case is too slow to prevent the start of the corresponding phrase from being cut off, meaning that there is a loss of information at each start of conversation and each time there is a changeover from one party to the other.

Furthermore, these implementations that use analog components, require a large number of components and a non-negligible amount of printed circuit area, thus handicapping the cost and bulkiness of such telephone sets. The invention sets out to overcome these disadvantages.

SUMMARY OF THE INVENTION

The invention consequently provides telephone apparatus for speech reception and transmission such as for example a telephone set, said apparatus being of the digital type and thus comprising in a manner generally known per se, a digital data processing microcontroller and a COFIDEC circuit providing analog speech data conversion into digital speech data and vice-versa, the apparatus including, in order to be able to provide the hands-free function, a microphone and a loudspeaker with their amplifier circuits associated with and linked by said COFIDEC to the microcontroller, digital calculating means being provided whereby said microcontroller permanently determines an average over a predetermined number of successive digital samples of the signals simultaneously present on each of the respective send and receive channels at their input to said microcontroller, in order to determine therefrom which channel should be transmitted without attenuation, or continue to be transmitted without attenuation, and in correlation therewith which channel should be attenuated, respective non-attenuated and attenuated value tables being consequently provided in said microcontroller.

The invention will be more readily understood and its advantages and other features will become more clear from the description that follows of one non-limiting example of an embodiment of a hands-free digital telephone set with reference to the attached drawings.

DETAILED DESCRIPTION OF A PREFERRED EMBODIMENT

Figure 1:
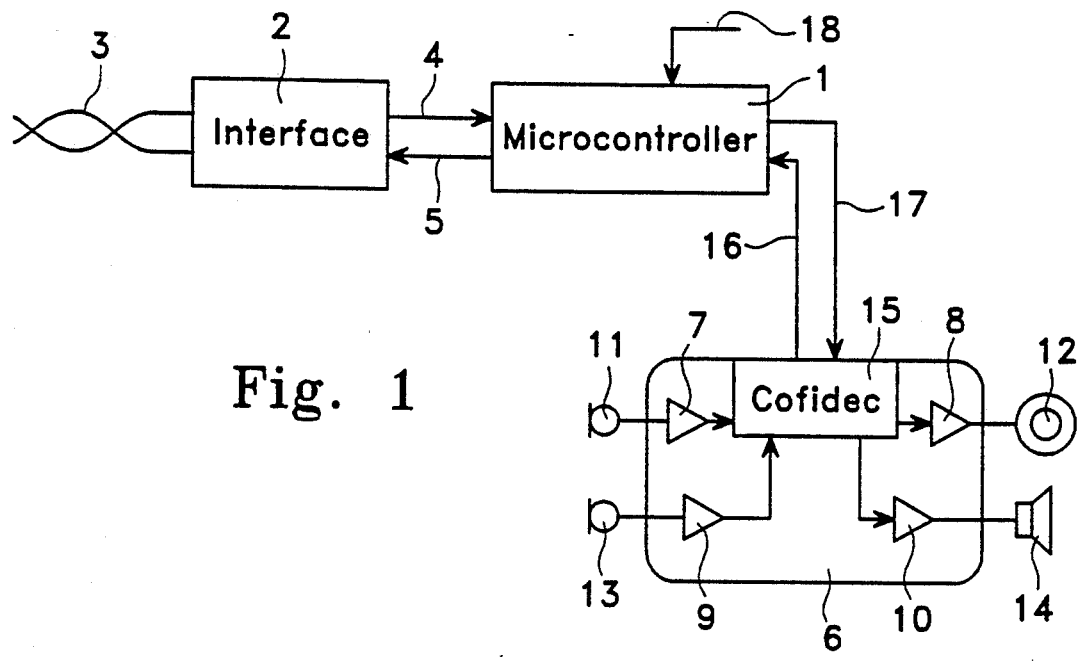
FIG. 1 is a block diagram of the telephone set.

If reference is made to FIG. 1, it will be seen that we are dealing with a digital telephone set of generally fairly conventional design, comprising:

a microcontroller 1 which manages all digital speech data that passes through the set. This is a control and calculating logic unit which includes a management microprocessor as well as at least one non-volatile ROM memory and at least one volatile RAM memory;

a digital interface 2 between the digital telephone line 3 and the microcontroller 1. This interface is linked to the microcontroller by two unidirectional digital speech signal transmission channels consisting of a receive channel 4 5 and a send channel 5; and an audio board 6 carrying the analog amplifiers 7,8,9,10 respectively associated with the microphone 11 of the handset, with the handset earpiece 12, with the microphone 13 which is for the case which concerns us here incorporated into the set's housing for the hands-free function, and with a loudspeaker 14 which is also integrated into the housing for the hands-free function. Furthermore, this board 6 includes a COFIDEC (Coding-Filtering-Decoding) circuit 15, in other words a circuit which per se is highly conventional in digital telephone sets and is designed to handle conversion of analog speech data into digital speech data and vice versa. This COFIDEC circuit 15 is connected to the microcontroller 1 by two unidirectional digital speech signal transmission channels one of which 16 is a send channel and the other of which is a receive channel 17. Furthermore, a manual switch 18 is connected to one of the ports of microcontroller 1 in order to manually select the hands-free function or the "handset" function. It will be noted that such a switch is conventionally provided on the keypad of analog hands-free telephone set of the known art.

Speech values are digitized by means of the COFIDEC circuit. This for example codes successive samples using a compression law the most widely known of which being the "A" law which is discussed here, or yet again the μ-law. The data are presented on the bus of the "line" interface 2 (in other words the bus comprising channels 4 and 5) every 125 ms.

When using the handset, the microcontroller 1 is transparent: it faithfully reproduces the data supplied by the COFIDEC and by the telephone line. In the hands-free mode however, it processes the digital signal in order to take a switchover decision adapted to privilege, in conformity with the alternate conversation principle, the send channel or the receive channel.

The telephone set in FIG. 1 hence operates, like analog sets in the known art, in alternate mode and hence in accordance with the same general principle but implemented in digital mode and with several particular features which will now be discussed in relation with FIGS. 2 to 6.

Figure 2:
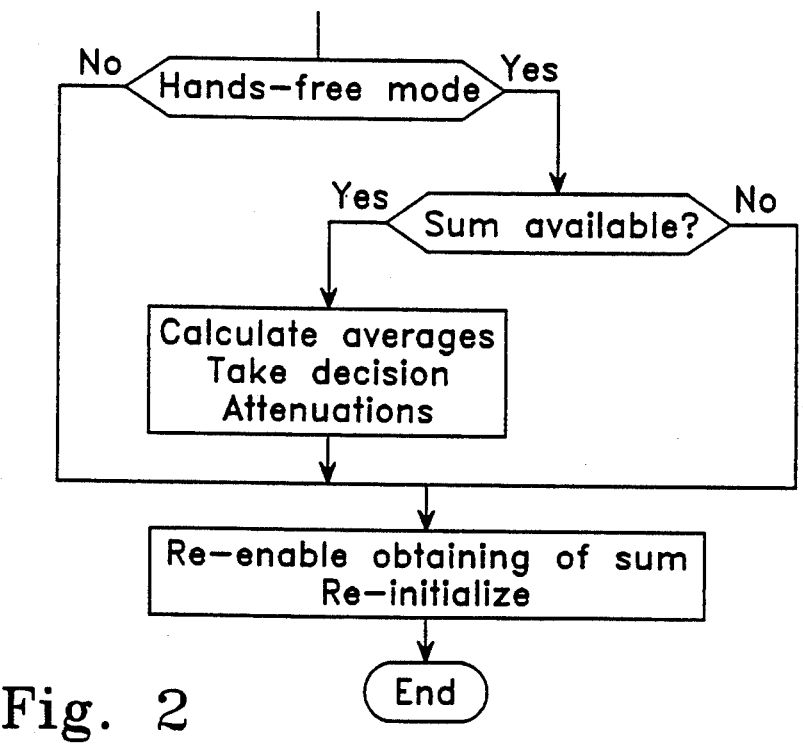
FIG. 2 is a general illustration of operation of this telephone set in hands-free mode.

The general operation of this digital telephone set in hands-free mode is shown in FIG. 2 in the form of an algorithm.

The microcontroller first tests the position of switch 18. If the latter is not at the hands-free position, the set operates as a conventional digital telephone set using the handset with its microphone 11 and earpiece 12.

If, on the contrary, this switch 18 is at the hands-free position, the microcontroller carries out successive additions of digitized speech samples that are available every 125 microsecond, for example, which are present at the respective send and receive ports, 16 and 4 respectively, of microcontroller 1. A sum is produced on each occasion over sixteen successive samples and in the same manner on the two channels 16 and 4. The particular way in which this sum is arrived at is shown diagrammatically in FIG. 3 and will be explained in detail below.

Figure 4:
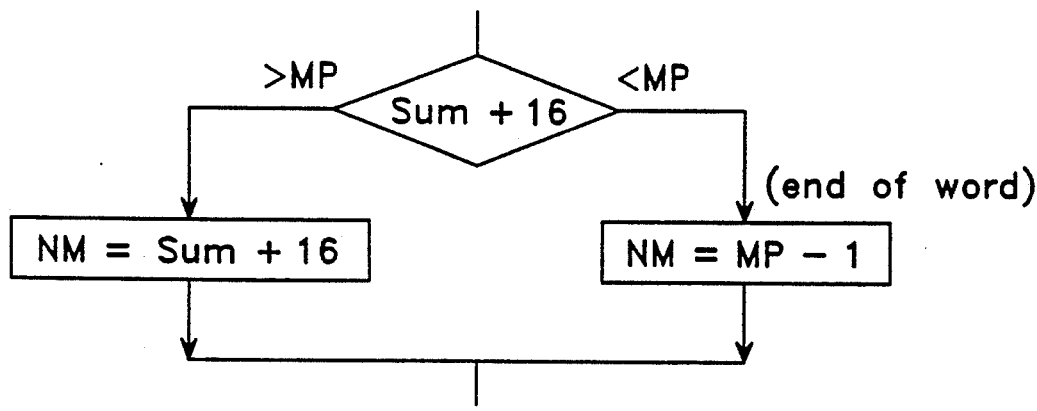
FIG. 4 illustrates how each average of these samples is calculated, with precautions being taken against unexpected channel switching.

When this sum is available on the channel being considered, microcontroller 1 calculates the average value relative to these 16 samples while, as will be seen when explaining FIG. 4, always taking a special precaution to avoid unexpected channel switchover between the words of the same phrase which would have the effect of chopping the conversation up. Having determined the average values (one on each channel), the microcontroller makes a decision using the method that will be explained below with reference to FIG. 5 and 6 as to which channel should alone be enabled (send or receive channel) along with digital implementation of the attenuation which should consequently be applied on the two channels: in this example 0 dB on the enabled channel and 36 dB on the inhibited channel.

Having done this, the various counters in the microcontroller are reinitialized and summing of samples on the two channels is again started.

Figure 3:
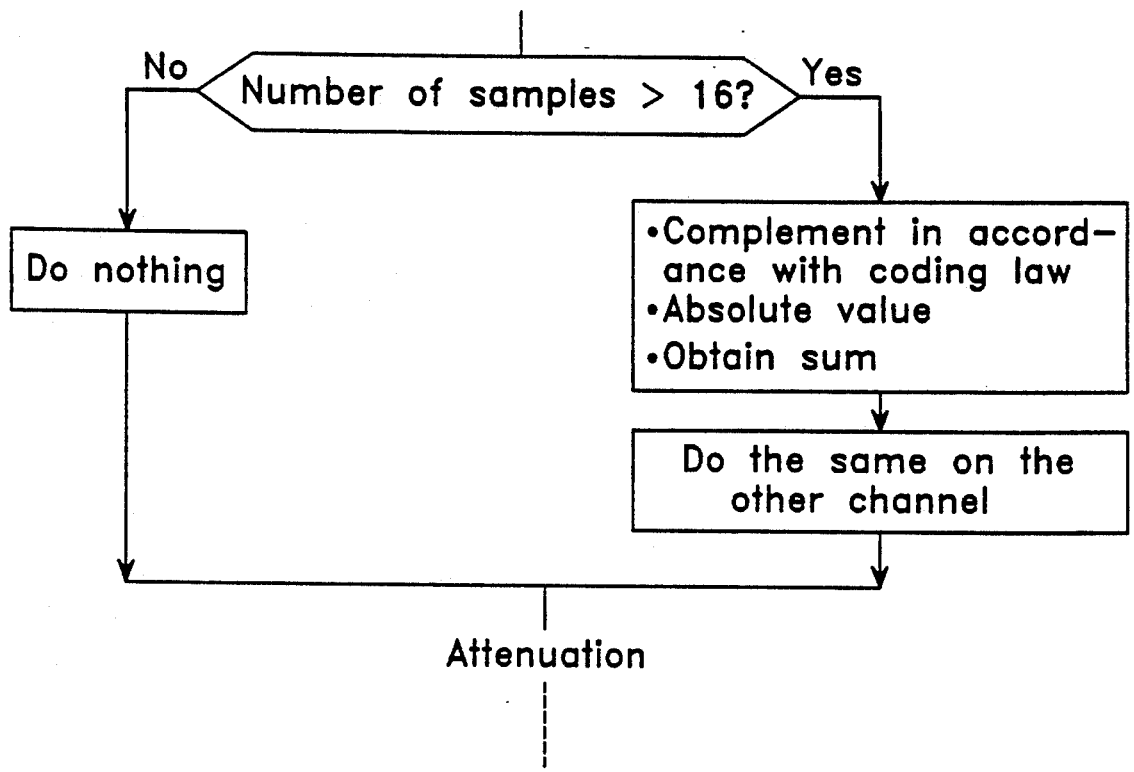
FIG. 3 illustrates how each sum of successive samples is calculated.

FIG. 3 shows, in algorithm form, calculation of the average amplitude of the send and receive signals, the method of calculation being the same for these two channels. The samples which arrive every 125 microseconds are complemented in order to obtain compressed coded values without inversion in accordance with the particular coding law used by the COFIDEC circuit (A-type compression law). They are made positive by setting the most significant bit to 1 and then added until all 16 samples have been obtained. This sum divided by 16 becomes the average value for the channel that is being monitored. It should be noted that the number 16 is particularly advantageous because it allows a good evaluation of the average signal to be obtained while being very practical to implement through programming. As this sum is available every 2 milliseconds (16 successive samples each appearing every 125 microseconds), this hands-free module is adapted to enable one of the two channels every 2 milliseconds approximately, which is ten times faster than the analog devices of the known art.

This addition being carried out on each channel, FIG. 4 shows how the new average value NM is calculated as a function of the previously calculated average value MP.

It is known that, at least in the French language, the amplitude of speech undergoes considerable attenuation at the end of the word. If no particular precautions were taken, it could happen that the sound on the other channel, although being attenuated by the alternating operating principle could become louder than the sound being uttered at the end of the word on the channel that is speaking: there would now be an undesirable switchover onto this other channel, resulting in a "chopping up" of the telephone conversation.

In order to avoid this phenomenon, the calculating means determine (see FIG. 4) if the sum that it has just calculated over the 16 samples is, when divided by 16, greater or less than the previous average value MP. If it is greater, this means that the end of the word has not been reached and the new average value NM is taken to be completely normally equal to this sum divided by 16. If it is less, a drop-off at the end of the word is starting to occur and, to limit this dropping-off, the new average value is taken as equal to the previous average value MP only diminished by one unit: a level holding time is thus established artificially between words, thus avoiding the "chopping up" phenomenon mentioned above.

As the two average values, for sending and receiving, are calculated in this way on the two channels, the calculating means can now determine which channel should be attenuated: this is the final decision-making and attenuation phase on one of the channels, and this phase will now be explained in more detail with reference to FIGS. 5 and 6.

Figure 5:
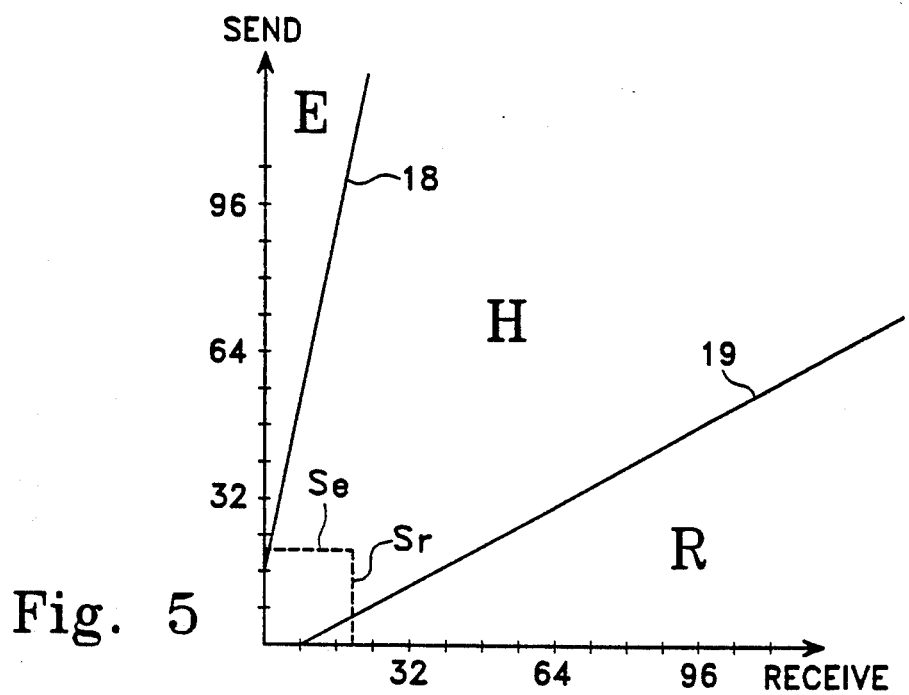
FIG. 5 is a graphical illustration which sets out to ease understanding of how a decision is taken as to which channel is to be attenuated.

FIG. 5 is a graph with Cartesian coordinates with the "receive" average values, as defined above, on the x-axis and the "send" average values on the y-axis.

This graph includes three areas, separated by two curves 18, 19 which are approximately linear:

a send area E, in which the channel that is privileged, in other words non-attenuated, is the send channel;

a receive area R in which the privileged channel is incontestably the receive channel;

a hysteresis area H, in which no new changeover is made.

In other words, the area E represents activation of the send channel, the area R activation of the receive channel, and the area H stands for an area in which the enabled channel is privileged in comparison with the attenuated channel and which is bordered by two transition curves: from receive to send, and from send to receive.

Moreover, in the area of small average values, two threshold values Se and Sr define a difference in the processing mode of the decision-taking operation.

Figure 6:
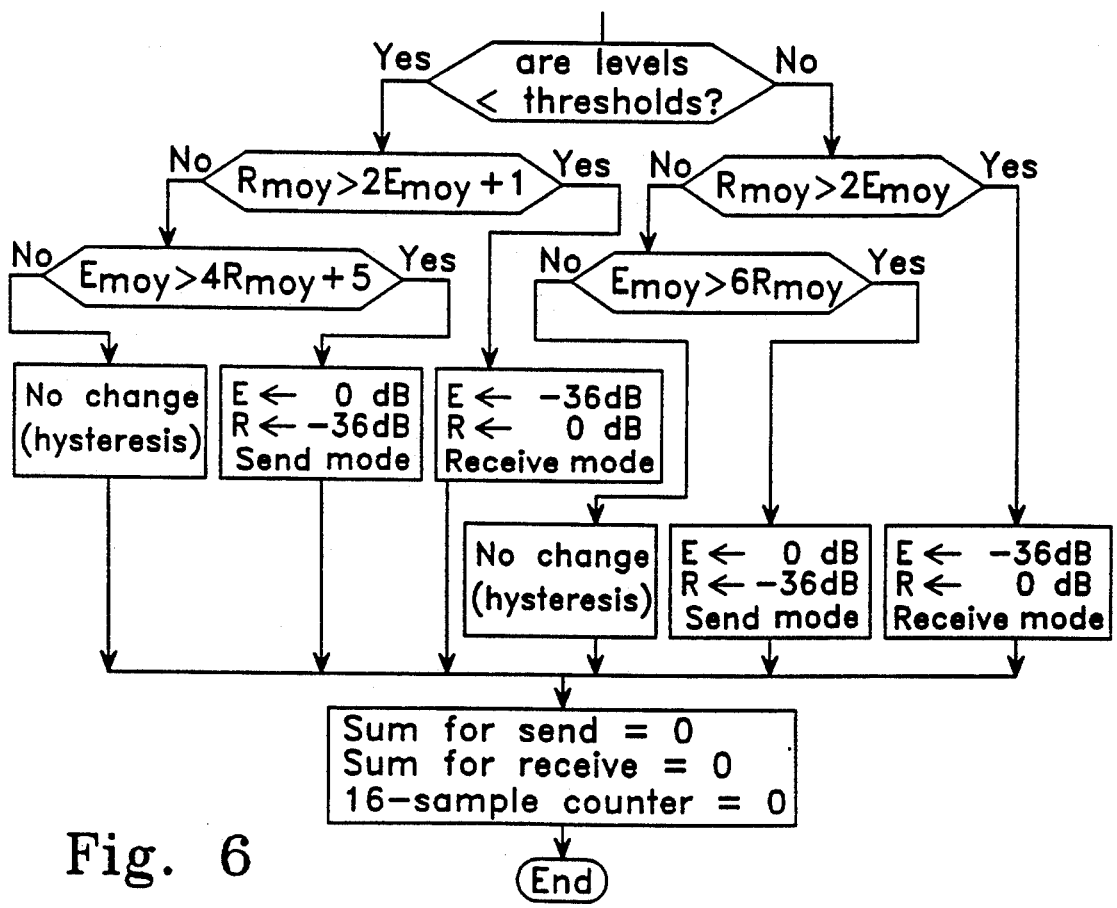
FIG. 6 explains how this decision is taken.

Decision-taking is shown diagrammatically in FIG. 6 in the form of an algorithm.

Firstly, the levels (calculated average values) are tested to find out if the low level area bordered by Se and Sr is involved. If the answer is YES, processing is as follows (left hand side of the algorithm in FIG. 6, for which the variables Rmoy and Emoy respectively stand for receive and send average values coded on 8 bits and hence varying from 0 to 255 levels).

If variable Rmoy is greater than twice variable Emoy plus 1, receive mode is enabled, in other words is not attenuated, and send mode is inhibited, in other words attenuated by (in this example) 36 dB.

It should be noted that the transparency of one channel and the attenuation of the other is carried out digitally using tables consequently provided in the non-volatile or ROM memory, of the microcontroller. The COFIDEC 15 supplies 127 positive and negative levels distributed in accordance with the abovesaid A-law coding. This law is known mathematically and it is easy to determine the correspondence between the value of the analog signal and the code supplied or received by the COFIDEC. Two tables are consequently calculated whereby the values supplied from the line or the COFIDEC indicate to the microcontroller what jump is to be made in the selected attenuation table. Thus, the code extracted from the table represents the code for the value attenuated by zero or by 36 dB.

If, on the other hand, this variable Rmoy is not greater than 2Emoy+1, it is necessary to know if the value is or is not in the hysteresis area. The variable Emoy is now compared with the value 4Rmoy+5. If its value is higher, this means that the value is inside the hysteresis area and there is consequently no switchover. If the value is less, a switchover to send mode takes places and the send channel is not attenuated, while the receive channel is attenuated by 36 dB by using the above-stated digital attenuation tables.

If now the two levels are not below the threshold values Se and Sr, processing (see the right-hand part of FIG. 6) is similar to what has just been described but the value "2Emoy+1" is replaced by "2Emoy" while the value "4Rmoy+5" is replaced by "6Rmoy".

After decision-taking, the whole unit is reinitialized as indicated at the bottom of FIG. 6 and all the digital operations can start again with a view to taking a decision on the following 16 samples.

The invention is obviously not limited to the example of an embodiment that has just been described. It applies, on the contrary, to other equivalent digital implementations whether these be more sophisticated or not. The term "telephone apparatus" should be taken to mean not only an actual telephone set but any other telephone terminal suitable for receiving and transmitting speech such as for example a telephone answering machine.

What is claimed is:

1. Digital hands-free telephone apparatus for reception and transmission of digital speech data, said apparatus comprising:
    a microcontroller for processing digital data and having a receive input and a receive output associated with a receive channel, and a send input and a send output associated with a send channel,
    a coding-filtering-decoding circuit for converting analog speech data into digital speech data and vice-versa,
    a microphone and a loudspeaker coupled by respective send and receive amplifier circuits and by said coding-filtering-decoding circuit o the send input and ht receive output of the microcontroller, respectively,
    decision means associated with said microcontroller for determining average levels over a predetermined number of successive digital samples of any signals present at the respective send and receive inputs to said microcontroller, and for using said average levels to perform a decision-making operation in which it is determined which channel should be processed without attenuation and which channel should be attenuated,
    at lest one attenuated value table for determining an attenuated output value form a given input value,
    digital attenuation means also associated with said microcontroller and responsive to said decision means and to said attenuated value table or deriving an attenuated microcontroller output for the channel to be processed with attenuation from its respective microcontroller input, and for deriving a non-attenuated microcontroller output for the other channel from the other microcontroller input, and
    end-of-word detecting means for maintaining the average level between two successive words in order to prevent sudden channel switching between the words of a given phrase,
    wherein the decision to switch from attenuation to non-attenuation and vice-versa is taken as a unction of a position of a point that represents, in Cartesian coordinates, the values of the average levels of the send and receive channels in three areas including a hysteresis area separating an area in which the transmit channel is not attenuated and an area in which the receive channel is not attenuated.

2. Telephone apparats according to claims 1, wherein said predetermine number of successive samples is equal to sixteen.

3. Telephone apparatus according to claim 1, wherein the area where the average level is low, two threshold values define a different in processing mode of the decision-making operations.

4. Telephone apparatus according to claim 3, wherein said decision means implements the following channel switching procedure:
    sampling levels of the send and receive inputs;
    calculating send and receive averages of the thus sampled levels;
    determining whether the thus calculated average levels correspond to a point within the low level area defined by said two threshold values;
    then, if the answer is YES:
    a) if said receive average is greater than twice the send average plus one, a receive mode is enabled by not attenuating the receive channel and a send mode is inhibited by applying attenuation to the send channel, or
    b) if said send average is greater than four times the receive average plus five, the send mode is enabled by not attenuating the send channel, and the receive mode is inhibited by applying attenuation to the receive channel, or
    c) if said receive average is not greater than twice the send average plus one and said send average is not greater than four times the receive average plus five, any currently enabled mode remains enabled and any currently inhibited mode remains inhibited;
    otherwise carrying out steps a) or b) or c) but with "twice the send average plus one" replaced by "twice the send average" and "four times the receive average plus five" replaced by "six times the receive average".

* * * * *